United States Patent
Chou

(10) Patent No.: US 7,329,374 B2
(45) Date of Patent: Feb. 12, 2008

(54) METHOD FOR MANUFACTURING RESING FILMS

(76) Inventor: Lung-Wen Chou, No. 20, Lane 256, Haiwei Rd., Longjing Township, Taichung County (TW)

( * ) Notice: Subject to any disclaimer, the term of this patent is extended or adjusted under 35 U.S.C. 154(b) by 502 days.

(21) Appl. No.: 11/011,100

(22) Filed: Dec. 15, 2004

(65) Prior Publication Data

US 2006/0125135 A1 Jun. 15, 2006

(51) Int. Cl.
*B29C 44/24* (2006.01)
(52) U.S. Cl. ............... 264/45.9; 264/46.4; 264/50; 264/53; 264/54; 264/257
(58) Field of Classification Search ........... 264/45.8, 264/45.9, 46.4, 50, 51, 53, 54, 257
See application file for complete search history.

(56) References Cited

U.S. PATENT DOCUMENTS 4,795,763 A * 1/1989 Gluck et al. ............ 521/99
5,424,014 A * 6/1995 Glorioso et al. ......... 264/45.3

* cited by examiner

*Primary Examiner*—Allan R. Kuhns
(74) *Attorney, Agent, or Firm*—Ming Chow; Sinorica, LLC

(57) ABSTRACT

A method for manufacturing resin films includes steps of mixing PU resin and hydroxyl compound to become a first-kind first-phase mixture, and of mixing a pigment with a foaming agent to become a second-kind mixture, of injecting the first-kind mixture into a kneading device to get mixed and kneaded to become a first-kind second-phase mixture, of sending the first-kind second-phase mixture into a second kneading device to get a first-kind third-phase mixture, and the second-kind mixture and the first-kind third-phase mixture both sent into a conveyer to get a third-kind mixture, and the final step is to send the third-kind mixture into a coating device for coating the third-kind mixture on a substrate cloth to get a resin film of an original color and fresh brilliance.

8 Claims, 5 Drawing Sheets

METHOD FOR MANUFACTURING RESING FILMS

BACKGROUND OF THE INVENTION

1. Field of the Invention

This invention relates to a method of manufacturing resin, particularly to one including a step of mixing resin materials, of adding a pigment and a foaming agent to get a mixture, of kneading the mixture and of coating the mixture on a substrate to form a resin film so as to keep its original color and fresh brilliance.

2. Description of the Prior Art

A conventional method for manufacturing resin films uses a coating device for coating reactive resin on a substrate cloth, and the reactive resin is made of a liquid polyurethane (PU) resin containing NCO and a liquid hydroxyl compound containing OH, a pigment and a foaming agent, which are all placed in a mixing kneading machine for carrying out mixing and kneading for various length of time, and finally pouring the mixed material in a coating device for carrying out coating a resin film on a substrate cloth.

However, the conventional method has its kneading process liable to produce high temperature with large pressure needed for kneading the pigment, the PU resin and the hydroxyl compound mixed together, resulting in color alteration by the high temperature so that its brilliance cannot be kept as good as expected, therefore the finished resin film is not so well qualified.

SUMMARY OF THE INVNETION

This invention offers a method for manufacturing resin films, which includes a step of mixing two main materials of PU resin and hydroxyl compound at first to become a first-kind first-phase mixture, and then the a pigment and a foaming member is mixed to become a second-kind mixture, and the two kinds of mixtures are sent into a conveyer to become a third-kind mixture, and then finally the third-kind mixture is sent into a coating device, which coats the third-kind mixture on a substrate cloth to form a resin film. So the color and the brilliance of the resin film can be kept as original, not affected by high temperature caused by kneading and mixing processes.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a method for manufacturing resin films in the present invention includes several steps as described as follows.

Figure 1:
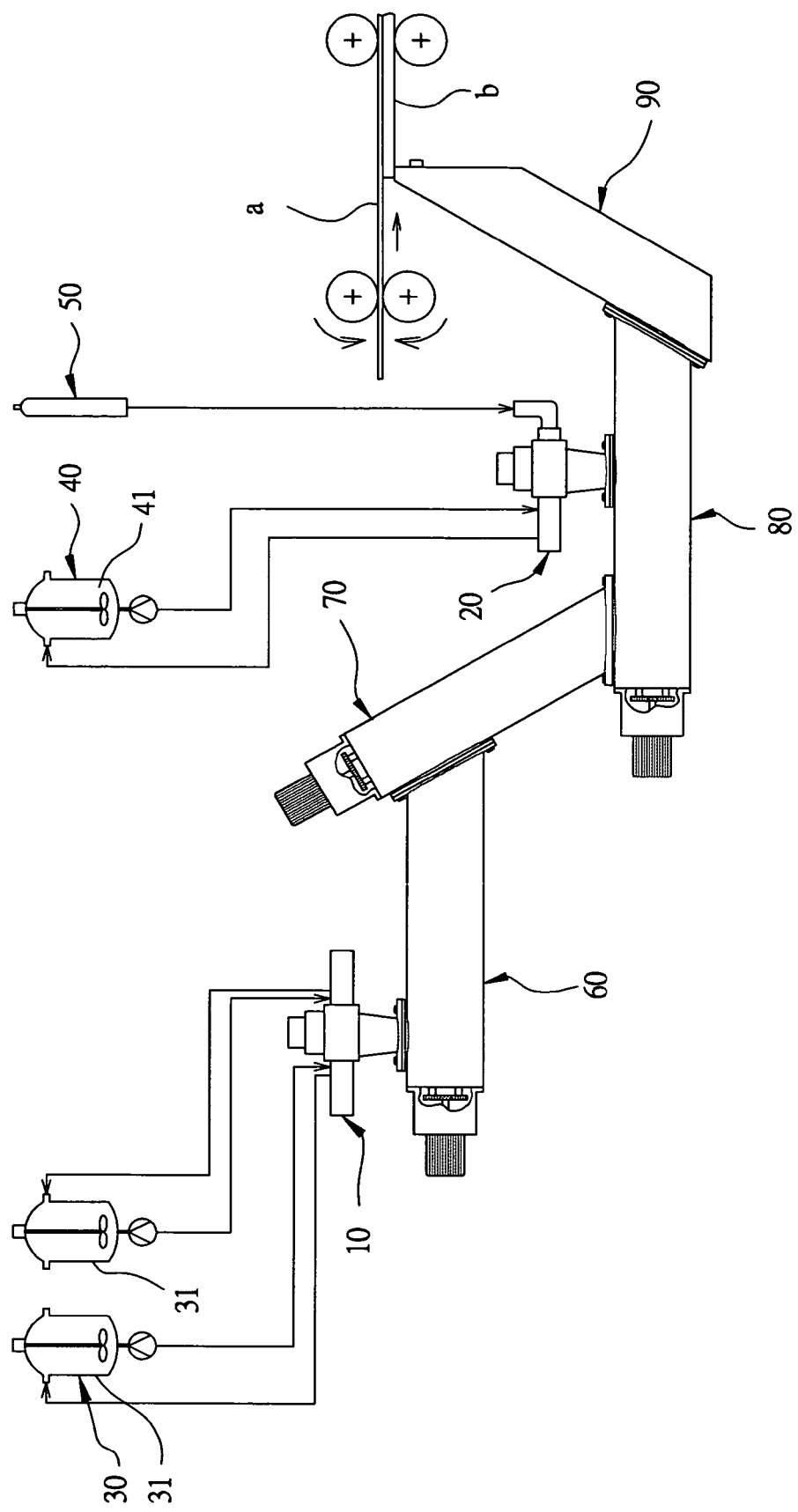
FIG. 1 is an arranged view of installations used for carrying out a method for manufacturing resin films in the present invention.

1. A first step is to inject PU resin containing NCO and hydroxyl compound in a first injecting mixing device 10 shown in FIG. 1 for mixing them to get a first-kind first-phase mixture.

2. A second step is to mix a pigment and a forming agent in a second injecting mixing device 20 for mixing them into a second-kind mixture.

Figure 2:
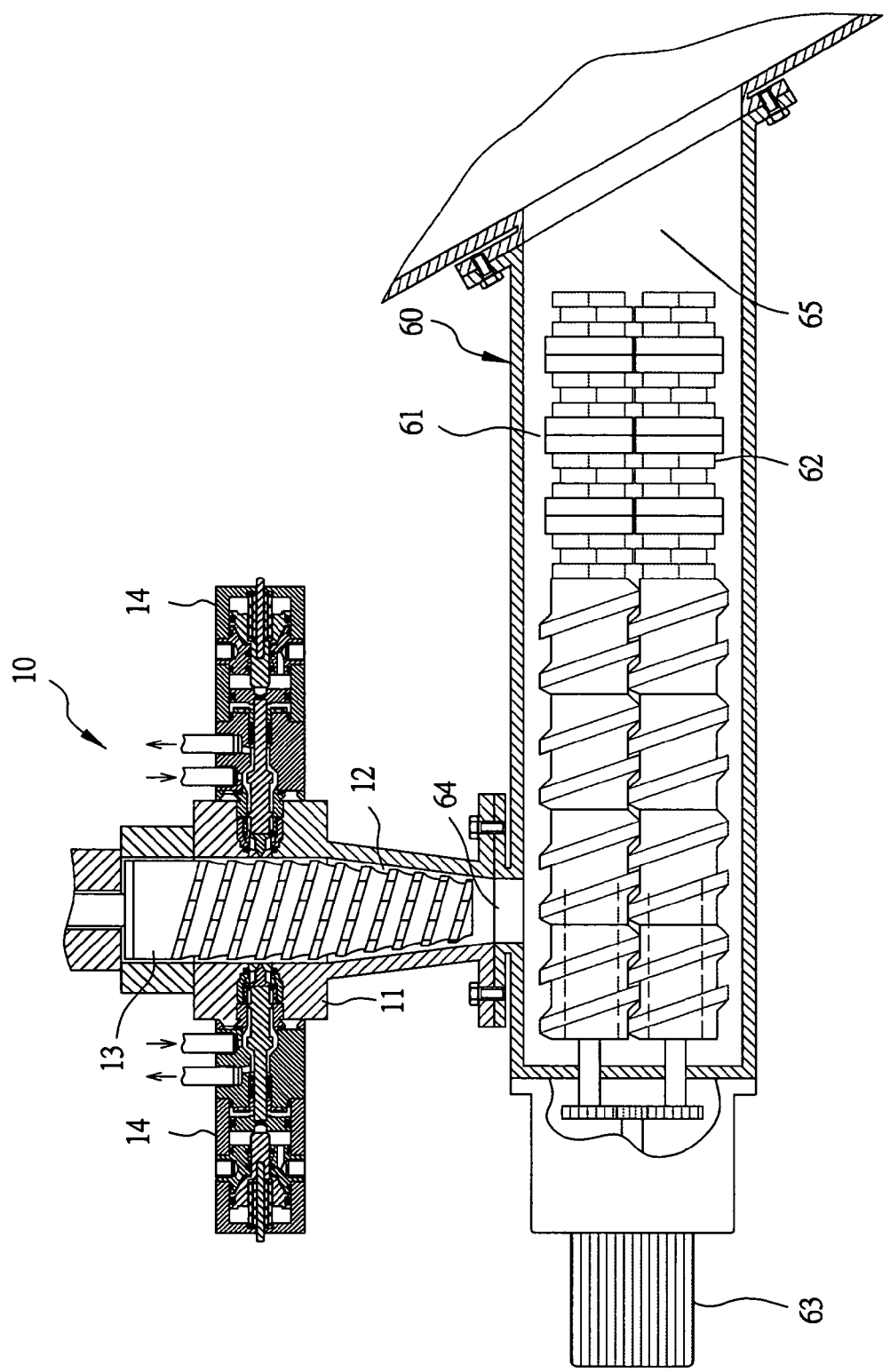
FIG. 2 is a cross-sectional view of a first injecting mixing device and a first kneading device in the present invention.
Figure 3:
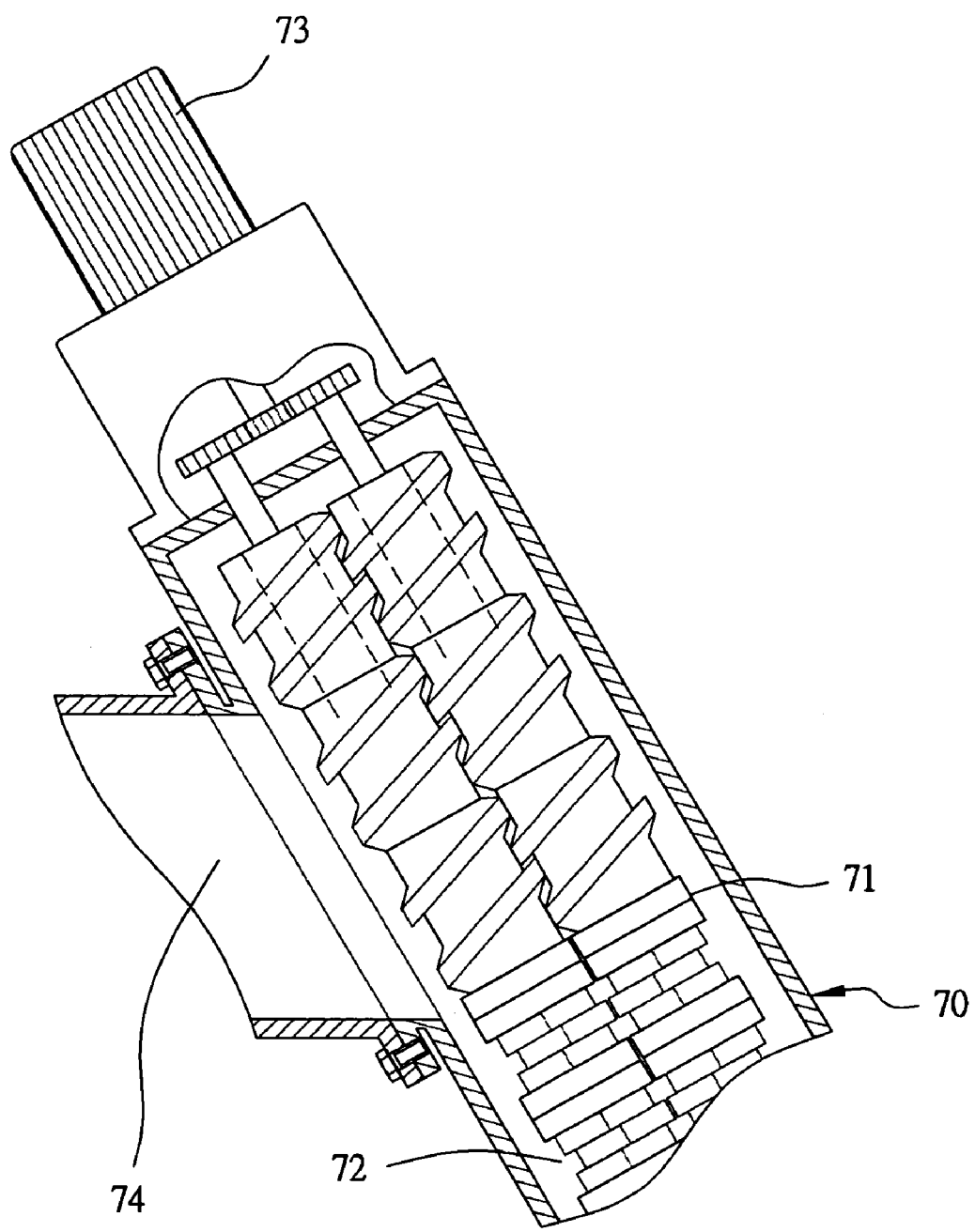
FIG. 3 is a partial cross-sectional view of a second injecting mixing device and a second kneading device in the present invention.

As shown in FIGS. 2 and 3, PU resin and hydroxyl compound are respectively placed in a pail of a measuring sending device 30 properly connected with the first injecting mixing device 10. The pigment is also placed in a pail 41 of a measuring sending device 40, and the foaming agent is filled in a foaming device 50. The measuring sending device 40 and the foaming device 50 both are properly connected with the second injecting mixing device 20. The foaming agent may be nitrogen gas, water, or physical foam. The first and the second injecting mixing device 10 and 20 both have an injecting mixing head 11 and 12, a lengthwise mixing chamber 12 and 22 formed in the center of the head 11 and 12, with a movable threaded rod 13 and 23 located in the mixing chamber 12 and 22. Further, two feeders 14 are provided at the circumference of the first injecting mixing device 10, respectively connected to the pails 31 of the PU resin and the hydroxyl compound. At the circumference of the second injecting mixing device 20 a feeder 24 and a joint 25 are provided, respectively connected with the pails 41 of the pigment and the foaming agent of the foaming device 50. Thus the liquid resin material and the foaming agent are injected in a definite amount in the mixing chamber 12 and 22 via the feeder 14 and 24 or the joint 25, and stirred and sent out by the rotating threaded rod 13 and 23 in a vertical way after mixing and instant reaction.

3. A third step is to pour the first-kind first-phase mixture in the first injecting mixing device 10 in a first kneading device 60 positioned horizontally and to mix and knead it into a first-kind second-phase mixture. The first kneading device 60 has a kneading chamber 61 in its interior, two kneading rods 2 positioned parallel in the kneading chamber 61, a speed-reduced motor 63 driving the two kneading rods 2 to rotate, an inlet 64 formed in the tubular wall of its front end and an exit 65 formed in the rear end. Then the exit end of the first injecting mixing device 10 is connected to the inlet 64 of the first kneading device 60 so the first-kind second-phase mixture may flow into the kneading chamber 61 through the inlet 64 and then further mixed and by rotation of the two kneading rods 62 to become a first-kind third-phase mixture.

4. A fourth step is to pour the first-kind second-phase mixture in the first kneading device 60 into a second kneading device 70 positioned slanting to the first kneading device 60 for carrying out a second mixing and kneading. The second kneading device 70 also has a kneading chamber 71, two kneading rods 72, a speed-reduced motor 73, and an inlet 74 in the tubular wall of the front end and connected to the exit of the first kneading device 60, so the first-kind third-phase mixture may flow in the kneading chamber 71 of the second kneading device 70 to receive a second kneading to become a first-kind third-phase mixture.

Figure 4:
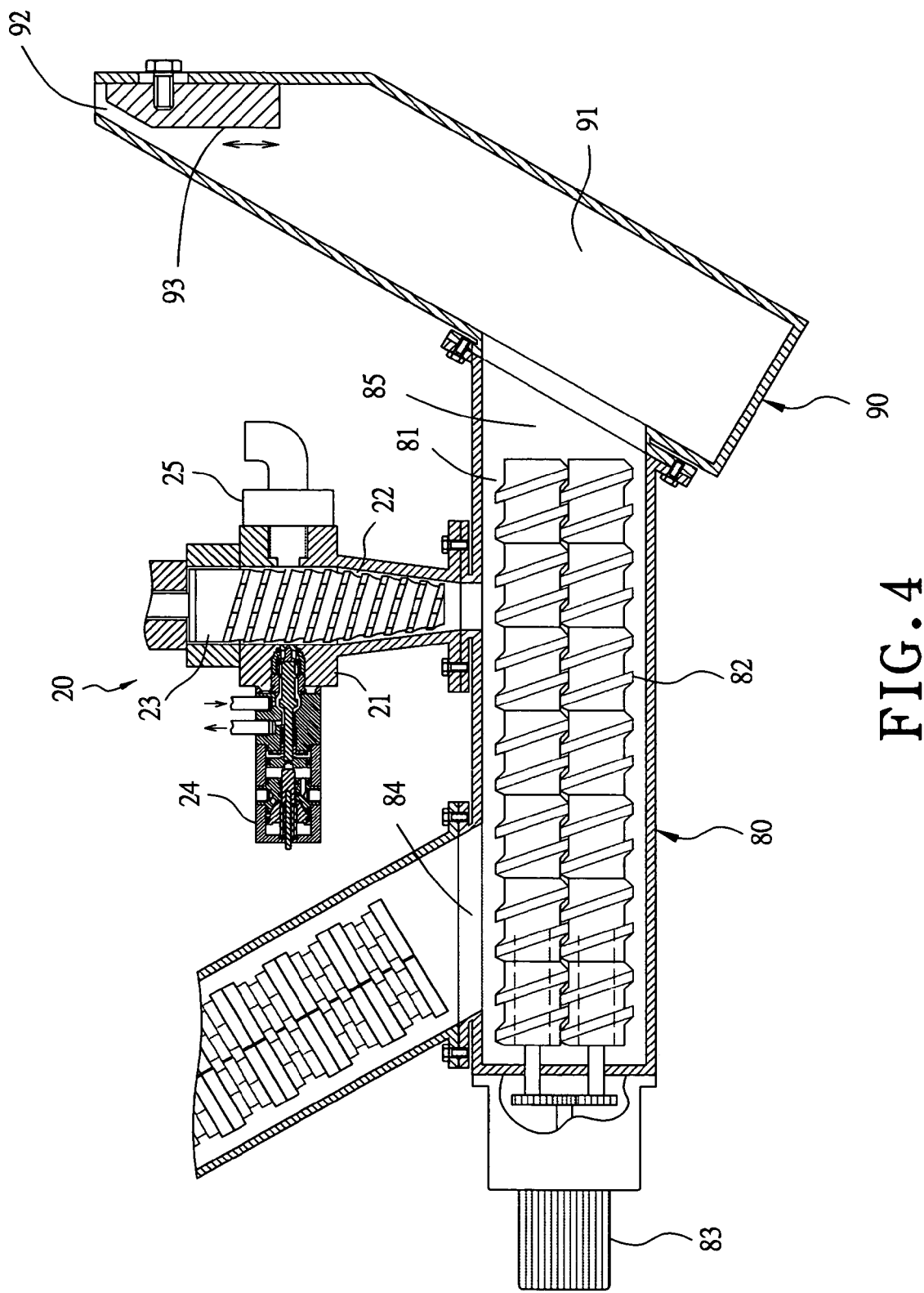
FIG. 4 is a partial cross-sectional view of the second kneading device, a conveyer and a coating device combined with one another in the present invention.
Figure 5:
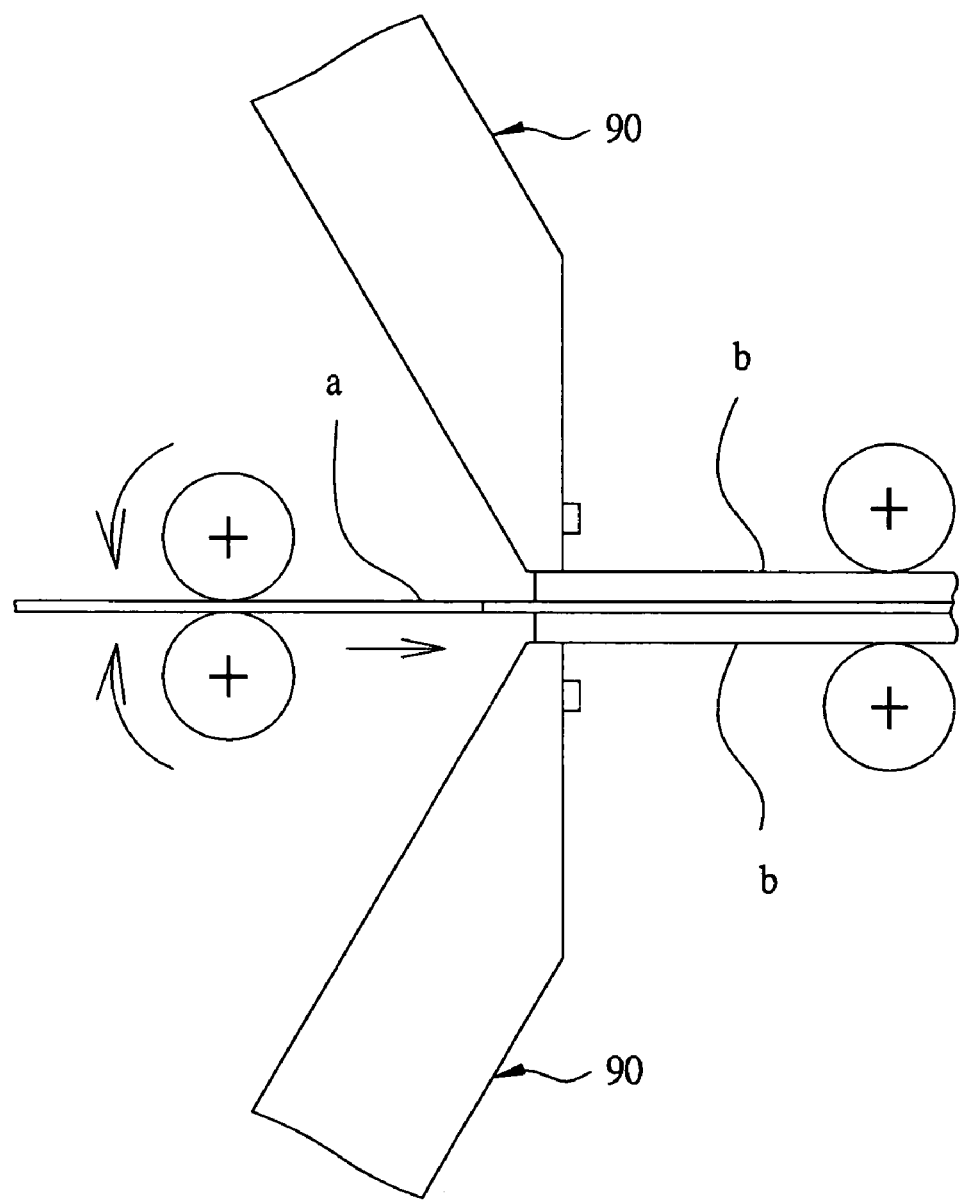
FIG. 5 is a side view of coating resin material on a substrate cloth by a second embodiment of a second embodiment of a method for manufacturing resin films in the present invention.

5. A fifth step, as shown in FIG. 4, is to pour the first-kind third-phase mixture in the second kneading device 70 into a conveyer 80, and the second-kind mixture in the second injecting mixing device 20 is also poured into the conveyer 80 to mix with the first-kind third-phase mixture to become a third-kind mixture. Then this third-kind mixture is sent into a coating device 90, which then coats the third-kind mixture on a substrate cloth (a) to form a resin film (b).

The conveyer 80 has an interior chamber 81, two threaded rods 82 located parallel in the interior chamber 81, a speed-reduced motor 83 driving the two threaded rods 82 to rotate, and an inlet 84 formed respectively in a front end and in an intermediate portion, and an exit 85 formed at a rear end. The inlet 84 at the front end is connected with the exit of the second kneading device 70, and the inlet 84 at the intermediate portion is connected with the exit of the second injecting mixing device 20, so the second-kind mixture in the second injecting mixing device 20 may be injected in the interior chamber 81 of the conveyer 80, wherein the two threaded rods 82 rotate to mix the first-kind mixture with the second-kind mixture to become the third-kind mixture and pushed rearward by the threaded rods 82 to the rear end of the conveyer 80 connected with the lower portion of the coating device 90.

The coating device 90 positioned slantingly has a store chamber 91 for receiving the third mixture coming from the conveyer 80, an exit 92 formed in a rear end and adjusted in its size by an adjuster 93 fitted movably in the rear end for controlling the thickness of a resin film to be coated. Further, the substrate cloth may be made of non-woven cloth, cloth, superfine fiber or the like.

In general, the method for manufacturing resin films according to the invention can prevent the pigment from receiving high temperature caused by mixing and kneading process for ensuring the color of the pigment kept as original not to lose its fresh brilliance.

While the preferred embodiment of the inventin has been described above, it will be recognized and understood that various modifications may be made therein and the appended claims are intended to cover such modifications that may fall within the spirit and scope of the invention.

What is claimed is:

1. A method for manufacturing resin films comprising:

A first step of injecting polyurethane (PU) containing at least NCO and hydroxyl compound containing OH in a first injecting mixing device for mixing the both to get a first-kind first-phase mixture;

A second step of injecting a pigment and a foaming agent in a second injecting mixing device for mixing the both to get a second-kind mixture;

A third step of injecting said first-kind first-phase mixture into a first kneading device for mixing and kneading to get a first-kind second-phase mixture;

A fourth step of injecting said first kind second-phase mixture in said first kneading device into a second kneading device for further mixing and kneading to become a first-kind third-phase mixture;

A fifth step of injecting said first-kind third-phase mixture into a conveyer, and of injecting said second-kind mixture into said conveyer for carrying out mixing said second-kind mixture with said first-kind third-phase mixture to get a third-kind mixture; and A sixth step of sending said third-kind mixture into a coating device, which then performs coating said third-kind mixture on a substrate cloth to form a resin film;

said second kneading device is provided with a kneading chamber, two parallel kneading rods located in said kneading chamber, a motor driving said two kneading rods to rotate, an inlet formed in a front end of a tubular wall and connected with an exit of said first kneading device so that said first-kind mixture in said first kneading device injected in said kneading chamber of said second kneading device for mixing and kneading once again said first-kind mixture to become the first-kind third-phase mixture; and said conveyer is provided with a conveying chamber, two parallel threaded rods fitted in said conveying chamber, a motor driving said two threaded rods to rotate, an inlet formed respectively in a front end and in an intermediate portion, an exit formed in a rear end, said inlet at the front end connected with an exit of said second kneading device to let said first-kind third-phase mixture in said second kneading device move into said conveyer, said inlet at the intermediate portion connected with an exit of said second injecting mixing device to let said second-kind mixture in said second injecting mixing device flow into said conveyer to mix with said first-kind third-phase mixture to become a third-kind mixture, which is then conveyed by rotation of said two threaded rods to a rear end of said conveyer.

2. The method for manufacturing resin films as claimed in claim 1, wherein said PU resin and said hydroxyl compound are respectively filled in a pail of a measuring sending device, and said pails are connected with said first injecting mixing device so that said two resin materials are measured and injected into said first injecting mixing device.

3. The method for manufacturing resin films as claimed in claim 1, wherein said pigment is placed in a pail of a measuring sending device, said foaming agent is placed in a foaming device, said measuring sending device being used by said pigment and said foaming agent and is connected with said second injecting mixing device; and the measuring sending device injects a measured amount of the two ingredients into said second injecting mixing device.

4. The method for manufacturing resin films as claimed in claim 1, wherein said foaming agent is nitrogen gas, water or a physical foaming agent.

5. The method for manufacturing resin films as claimed in claim 1, wherein said first injecting mixing device has an injecting head, said head having a lengthwise mixing chamber, two movable threaded rods provided in said mixing chamber, two feeders fixed on its circumference and connected with a pail respectively for storing said PU resin and said hydroxyl compound so said PU resin and said hydroxyl compound are injected into said mixing chamber in a definite amount through said two feeders and got mixed and reacting by rotation of said two threaded rods and then flowing vertically down into said first kneading device.

6. The method for manufacturing resin films as claimed in claim 1, wherein said second injecting mixing device is provided with an injecting head, said head having a lengthwise mixing chamber, two threaded rods provided in said mixing chamber, a feeder and a joint provided at its side respectively connected with a pail of said pigment and said foaming agent so said pigment and said foaming agent are injected in said mixing chamber to get mixed and react by rotation of said threaded rods, and then flow vertically down into said conveyer.

7. The method for manufacturing resin films as claimed in claim 1, wherein said first kneading device is provided with a kneading chamber, two parallel threaded rods placed in said kneading chamber, a motor driving said threaded rods to rotate, an inlet formed in the tubular wall of a front end, an exit formed in a rear end, said first injecting mixing device connected with said inlet of said first kneading device wherein the first-kind mixture flows into said kneading chamber; and said two kneading rods knead by rotation to get the first-kind second-phase mixture.

8. The method for manufacturing resin films as claimed in claim 1, wherein said substrate cloth is non-woven cloths, or super fine fiber.

* * * * *